(12) United States Patent
Liu et al.

(10) Patent No.: US 6,719,431 B2
(45) Date of Patent: Apr. 13, 2004

(54) ADJUSTING APPARATUS FOR PROJECTOR

(75) Inventors: I-Hsien Liu, Hsin-Chu (TW); Fu-Shun Kao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 10/248,551

(22) Filed: Jan. 26, 2003

(65) Prior Publication Data

US 2003/0147056 A1 Aug. 7, 2003

(30) Foreign Application Priority Data

Feb. 6, 2002 (TW) ...................................... 91201834 U

(51) Int. Cl.[7] .............................................. G03B 21/14
(52) U.S. Cl. ....................................................... 353/70
(58) Field of Search .................... 353/70, 119; 248/157, 248/188.2

(56) References Cited

U.S. PATENT DOCUMENTS 6,302,543 B1 * 10/2001 Arai et al. ..................... 353/70
6,461,002 B1 * 10/2002 Su ............................. 353/119
2002/0113951 A1 * 8/2002 Huang et al. ................ 353/119
2002/0140909 A1 * 10/2002 Tanaka ......................... 353/70
2002/0153465 A1 * 10/2002 Su ............................. 248/404

* cited by examiner

Primary Examiner—William C. Dowling
(74) Attorney, Agent, or Firm—Winston Hsu

(57) ABSTRACT

The present invention comprises a body, an upper cover which forms a slide with the body, and a catching section which is in the slide and has at least one protrusive catching piece on a side of a front side surface. Another side of the catching section connects to an adjusting button with extended width, and the adjusting button is protruded from the body. A sliding sleeve set on a side of a front surface of the body, and a supporter is through the sliding sleeve. A back of the supporter has a plurality of positioning rack engaging with the catching piece. Besides, a rear side of the catching section is fastened on one end of a restoring element, and the other end is fixed on a rear wall of the body. The rear side of the catching section sets a guiding element, which two opening ends are through two guiding slots attached to a top edge of the rear wall. Each guiding slot is formed by a restricting block for guiding the catching section to move smoothly.

8 Claims, 6 Drawing Sheets

ADJUSTING APPARATUS FOR PROJECTOR

FIELD OF THE INVENTION

The invention relates to an adjusting apparatus, and more particularly to the adjusting apparatus for a projector.

BACKGROUND OF THE INVENTION

As the science being developed rapidly, projectors are applied to various fields, such as the consumption products to high technology products, and the application range is expanded continuously. For instance, the exhibitions for big conference rooms or commercial projecting screens or televisions are to cooperate with the presentation contents for instantly showing. However, a general type of projectors has to be adjusted for the height of the projection lens so that the projected image is in a proper position. Therefore, how to fast and easily set up a projector for a user being pleasured to operate and then promoting the competition becomes an important issue in the field.

Please refer to FIG. 1, which is a projector 10 in prior arts. For the purpose of the installment convenience and the clean appearance, generally an adjusting apparatus 12 is designed below a body 11. Then, pressing an adjusting button 121 is to let a supporter 122 move freely along a vertical direction for a selected inclined height, so a projection lens 13 is aimed at a screen. Referring to FIG. 2, a bottom of the adjusting button 121 combines with a bottom of a catching section 123, and another end of the catching section 123 is set a catching flange 124, which is able to engage with a positioning rack 125 of the supporter 122. Further, the bottom of the adjusting button 121 and the catching section 123 has an elastic element 126, and one end of the elastic element 126 is fastened on a body 127. Therefore the adjusting button 121 and the catching section 123 are in a slide 251 of the body 127 and freely move. While pressing the adjusting button 121 to move the catching section 123 inward, the catching flange 124 is then released from the positioning rack 125 so that the supporter 122 freely moves along the vertical direction for a suitable inclined height. The next step is to release the adjusting button 121 to drive a match of catching flange 124 and positioning rack 125 for keeping a selected height of supporter 122. Due to the projector 10 being applied in a dark environment and the adjusting apparatus 12 being installed below the body 11 causing hardly finding out adjusting button 121, a user must take several times to correctly press on adjusting button 121 to finish fixing the height of projector. Besides, the adjusting button 121 is set aside of the supporter 122, so a pressing force is not uniform in case of pressing on adjusting button 121 to bring about the inclined phenomena of the adjusting button 121 and the catching section 123, shown as a dotted line 129. Then, the catching flange 124 cannot smoothly depart from the positioning rack 125. Hence it must apply a harder force to let catching flange 124 come off the positioning rack 125 for completing the height adjustment of the projector.

SUMMARY OF THE INVENTION

An object of the present invention is to provide an adjusting apparatus for a projector to have a uniform force for guiding an adjusting button and a catching section to simultaneously move and creating more convenient operation.

The other object of the present invention is to provide an adjusting apparatus for a projector to have an extended adjusting button to be easily pressed and found out for more convenience.

To approach aforesaid objects, the present invention comprises a body, an upper cover which forms a slide with the body, and a catching section in the slide. A side of a front surface of the catching section has at least one protrusive catching piece, another side of the catching section connects to an adjusting button with extended width, and the adjusting button is protruded from the body. A sliding sleeve sets on a side of a front of the body, and a supporter is through the sliding sleeve. A back of the supporter has a plurality of positioning rack matching with the catching piece. Besides, a rear side of the catching section is fastened on one end of a restoring element, and the other end is fixed on a rear wall of the body. The rear side of the catching section has a guiding element, which two opening ends are through a top edge of the rear wall to attach to a guiding slot formed by two restricting blocks for guiding the catching section to move smoothly.

DETAILED DESCRIPTION OF THE INVENTION

Figure 1:
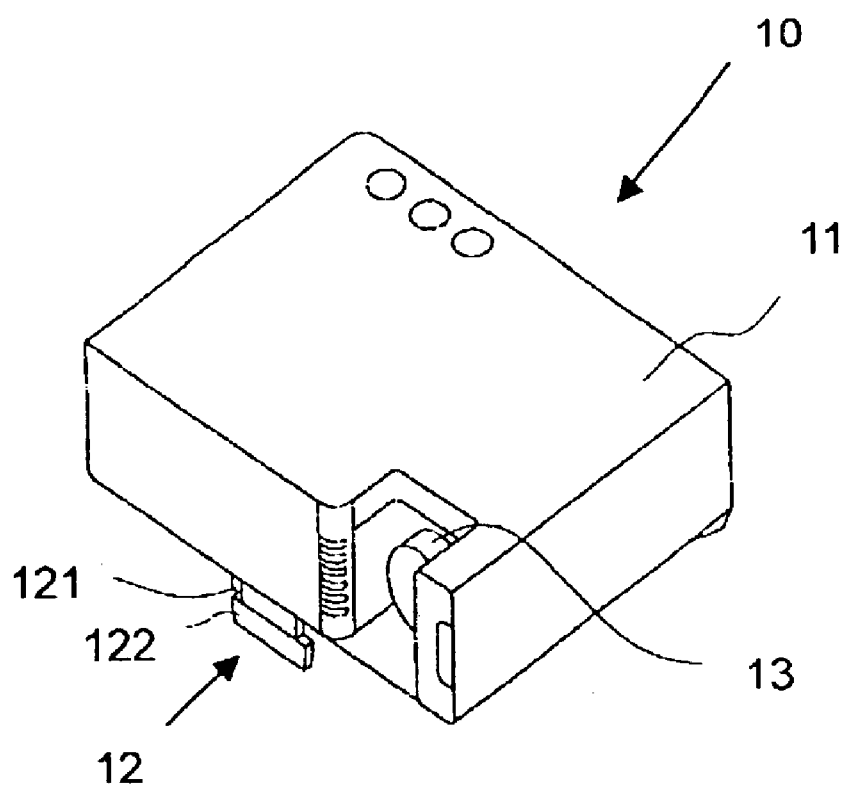
FIG. 1 is a perspective view of a projector of prior art.
Figure 2:
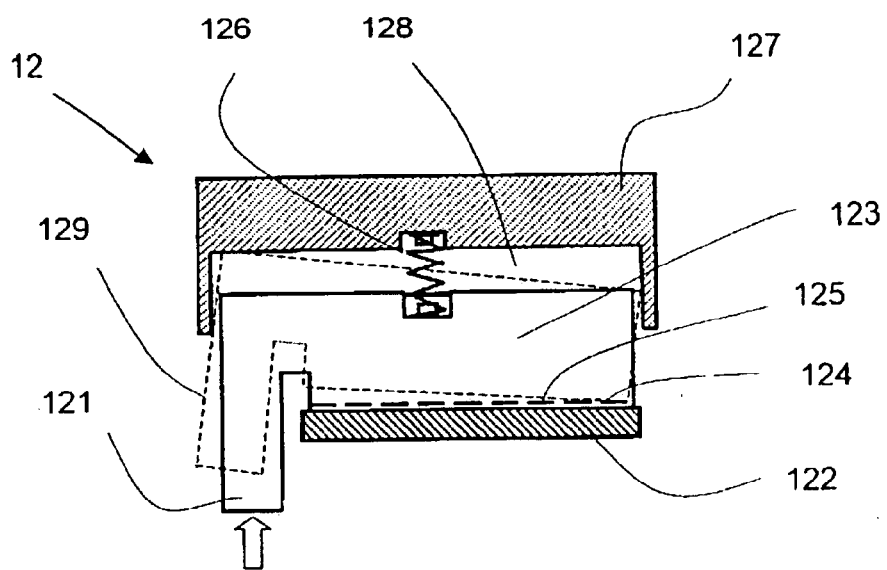
FIG. 2 is a schematic diagram of an adjusting apparatus of prior art.
Figure 3:
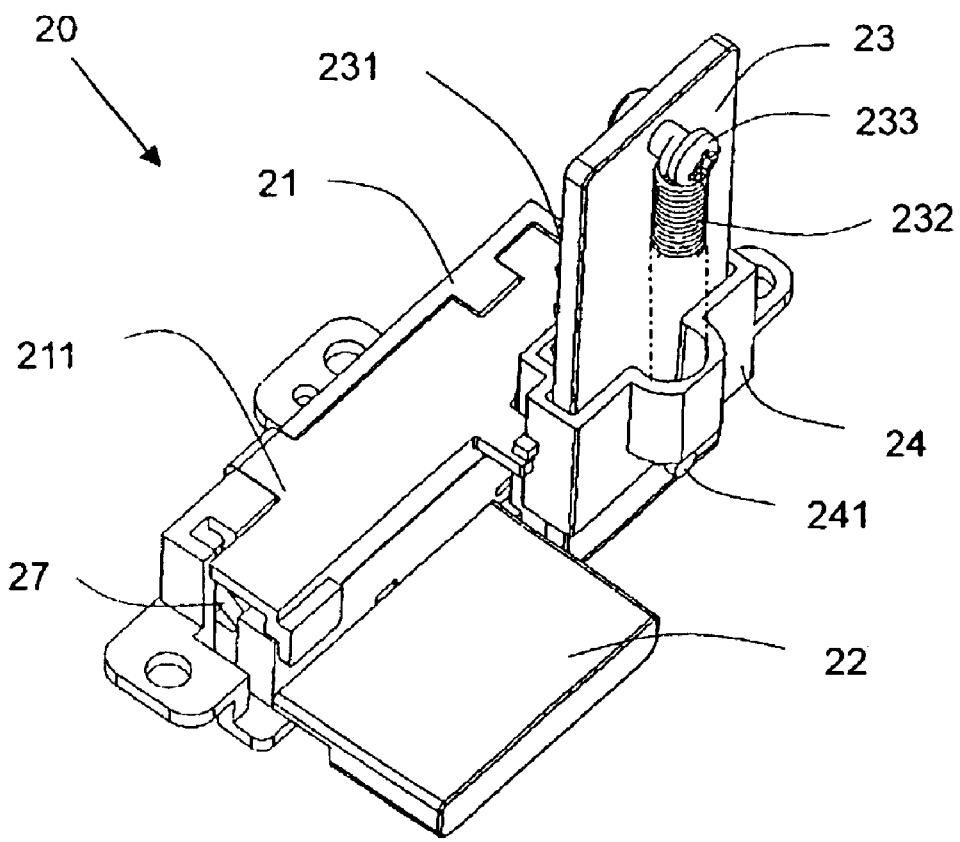
FIG. 3 is a perspective view of an adjusting apparatus of the present invention.

Referring to FIG. 3 which is an adjusting apparatus 20 of a preferred embodiment of the present invention, the adjusting apparatus 20 comprises a body 21, an adjusting button 22, and a supporter 23, etc. Via pressing the adjusting button 22 protruded from a front surface of the body 21, the positioning rack 231 of the supporter 23 is then released or engaged. The supporter 23 in a sliding sleeve 24 is capable of freely moving by means of an elastic element 232 for adjusting an inclined height of the projector.

Figure 4:
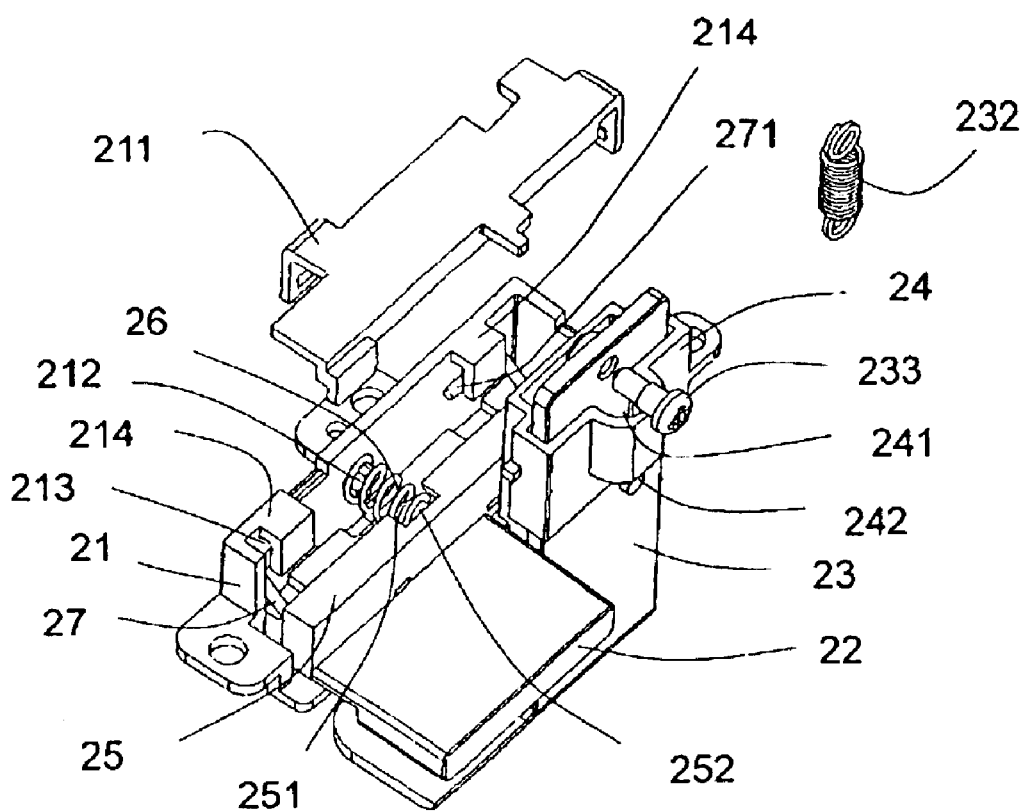
FIG. 4 is a view of an internal structure of the adjusting apparatus of the present invention.

Referring to FIG. 4, the body 21 of the adjusting apparatus 20 has an upper cover 211. Below the upper cover 211, a catching section 25 is installed in a front of the body 21, a side of a front surface of the catching section 25 connects to a rear end of the adjusting button 22, and another side is fastened to the sliding sleeve 24. A tunnel 241 is installed protrusively in a center of a front wall of the sliding sleeve 24. A fixing pin 242 sets protrusively right below the tunnel 241. A supporter 23 is inserted into the sliding sleeve 24, and a screw 233 is around a top end of a front surface of the supporter 23. One end of the elastic element 232 is fixed on the screw 233 and pass through the tunnel 241, and the other end of the elastic element 232 is fastened on the fixing pin 242. A plurality of positioning rack 231 is levelly set on the rear surface of the supporter 23. Besides, a center of a rear surface of the catching section 25 mounted a fixing slot 251, which has a positioning pin 252 inside. One end of an elastic restoring element 26 is placed into the fixing slot 251 and positioned by the positioned pin 252, and the other end of the restoring element 26 is affixed by a pin 212 on the inside of the body 21. Thus the catching section 25 can move freely in the body 21.

Figure 5:
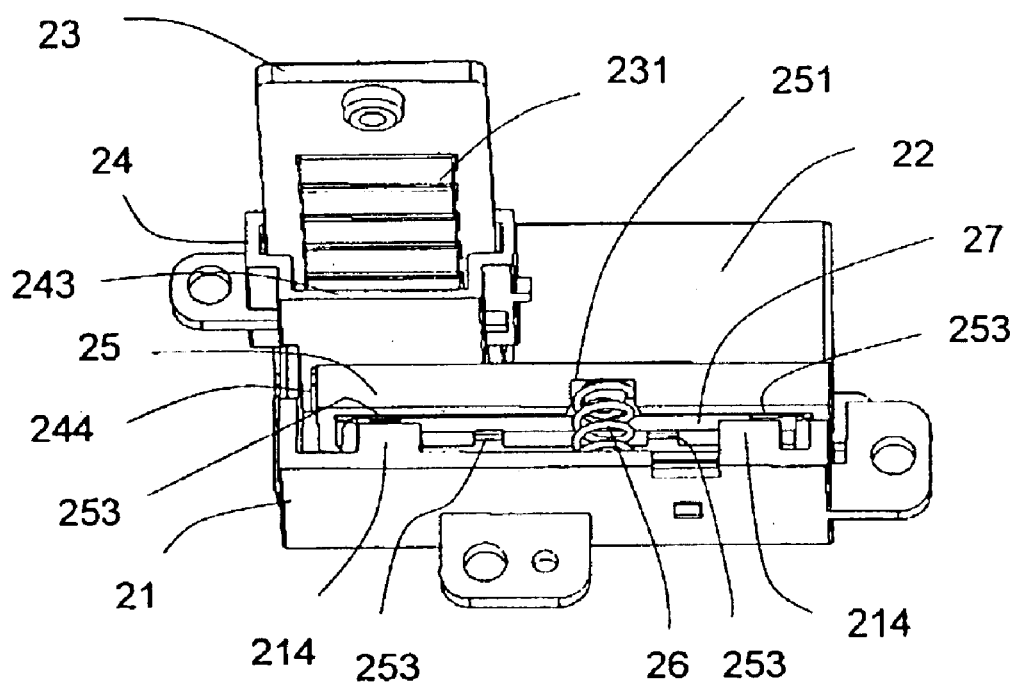
FIG. 5 is a view of another internal structure of the adjusting apparatus of the present invention.
Figure 6:
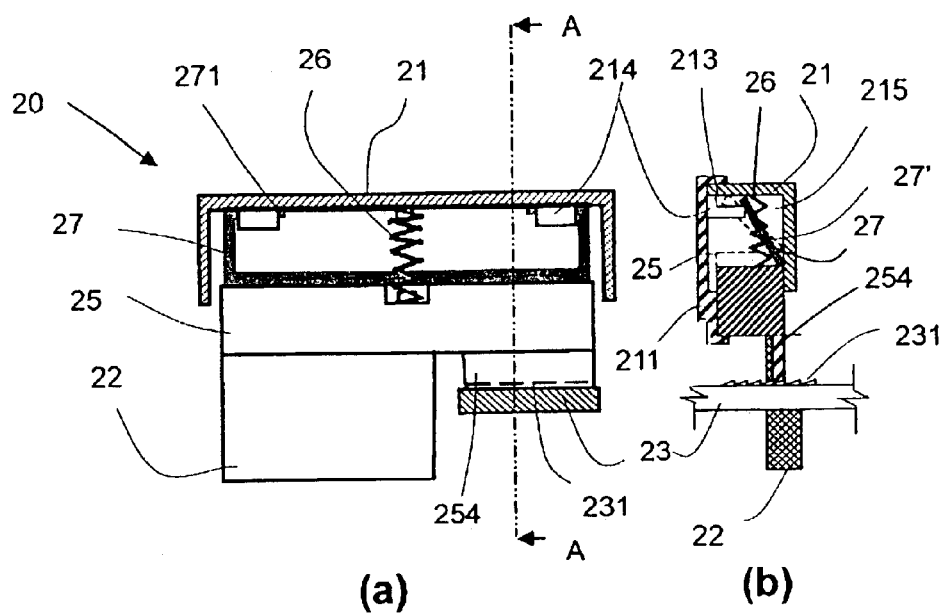
FIG. 6(a) is an action schematic diagram of the adjusting apparatus of the present invention.
FIG. 6(b) is an action side cross-sectional schematic diagram along A—A direction of the adjusting apparatus of the present invention.

On the other hand, a guiding element 27 with cylinder figure is attached to a bottom end of the rear surface of the catching section 25, two ends of the guiding element 27 are separately extended toward inclined and up directions, and two opening ends 271 with "L" figures of internal bending individually penetrate into two guiding slots 213. Each guiding slot 213 are formed by a restricting block 214 with "L" figures up side down connecting to one side of a top edge of the rear wall of the body 21. Referring to FIG. 5 and FIG. 6, a lower side of the rear surface of the catching section 25 has several clamping pieces 253, which clamp guiding element 27 from both end, and therefore the guiding element 27 can move freely. A rear wall of the sliding sleeve 24 protrudes outwardly to shape a channel 243 with "." figure, that is to let the positioning rack 231 of the supporter 23 easily go through the channel 243 without disturbance of adjusting movement of the supporter 23. A hole 244 is designed below the channel 243 so that the catching piece 254 protruding from the catching section 25 moves in and out without difficulty to engage with or release from the positioning rack 231.

Referring to FIGS. 6(a) and 6(b), the adjusting apparatus 20 enlarges the pressing area of the adjusting button 22 to let the user easily find out the location of the adjusting button 22 in a dark environment, so the user may fast adjusts the height of the projector. Although the pressing area is broadened and a correct pressing position is hardly found out, a special design for the present invention is that the guiding element 27 is installed. While the adjusting button 22 is pressed, the catching section 25 connected to the rear end of the adjusting button 22 is driven toward rear side of the body 21 to compress the restoring element 26 and push the guiding element 27. Then, the two opening ends 271 of the guiding element 27 may shift along the guiding slot 213 formed by the two restricting blocks 214 and the body 21 to force the whole guiding element 27 to move to a place of the dotted line 27'. In the meantime, the whole catching section 25 connected to the guiding element 27 is moved backward to impel the catching piece 254 on another side of the catching section 25 shifting toward the back as well. Thus the catching piece 254 may not be inclined and retreat to successfully get away with the positioning rack 231 for freely moving the supporter 23 up and down in order to select a proper inclined height of the projector. Then, releasing the adjusting button 22, the catching section 25 and the guiding element 27 is pushed outward by the elastic force of the restoring element 26 to drive the catching piece 254 and the positioning rack 231 for engaging. And the elastic element 232, one end fastened on the supporter 23, pulls the supporter 23 down to be locked by the positioning rack 231, such as a ratchet or a rack, for positioning. Hence, the projector is able to project images properly on the screen.

Moreover, while lowering the height of the projector, it is no need to press the adjusting button 22. On the contrary, directly pushing into the supporter 23 along a single direction, let the catching piece 254 slide along the inclined direction of the positioning rack 231 to fast and conveniently lower the height of the projector and collect the projector. Similarly, by means of a selected locking direction of the positioning rack 231 and a selected pulling direction of the elastic element 232, lifting the height of the projector may not need to press the adjusting button 22 as well. Further, the upper cover 211 lays over the catching section 25 to form a slide 215, and the catching section 25 is limited from both sides to only shift in the slide 215. Therefore, shaking condition for the catching section 25 is reduced.

What is claimed is:

1. An adjusting apparatus for a projector comprising:
    a body having an upper cover which forms a slide with the body, a front surface, and a rear wall which has two restricting blocks on a top edge of the rear wall to form guiding slots;
    a sliding sleeve installed on a side of the front surface of the body;
    a supporter which passes through the sliding sleeve and has a plurality of positioning rack on a rear surface of the supporter;
    a catching section which is installed in the slide and has a front side surface, which has at least a protrusive catching piece on one side to engage with the positioning rack, and a rear side surface;
    an adjusting button connecting to another side of the front side surface of the catching section and protruding out of the body;
    at least one restoring element which has one end fastened on the rear side surface of the catching section and the other end fastened on the rear wall of the body; and
    a guiding element which connects to the rear side surface of the catching section and has two opening ends separately being through the guiding slots.

2. The adjusting apparatus for the projector of claim 1, wherein a width of the adjusting button is greater than a half width of the adjusting apparatus.

3. The adjusting apparatus for the projector of claim 1, wherein the supporter is fastened on one end of an elastic element and the other end of the elastic element is fixed on the sliding sleeve.

4. The adjusting apparatus for the projector of claim 3, wherein the sliding sleeve has a tunnel for the elastic element going through.

5. The adjusting apparatus for the projector of claim 1, wherein the rear side surface of the catching section has a plurality of clamping pieces which clamp the guiding element from both sides for the guiding element moving freely.

6. The adjusting apparatus for the projector of claim 5, wherein the guiding element is cylindrical shape.

7. The adjusting apparatus for the projector of claim 1, wherein the positioning rack is a ratchet with a single direction.

8. The adjusting apparatus for the projector of claim 1, wherein the positioning rack is a rack.

* * * * *

UNITED STATES PATENT AND TRADEMARK OFFICE
CERTIFICATE OF CORRECTION

| | | |
|---|---|---|
| PATENT NO. | : 6,719,431 B2 | |
| APPLICATION NO. | : 10/248551 | |
| DATED | : April 13, 2004 | |
| INVENTOR(S) | : Liu et al. | |

It is certified that error appears in the above-identified patent and that said Letters Patent is hereby corrected as shown below:

Title Page, Item (22), under "Filed", in Column 1, Line 1, delete "Jan. 26, 2003" and insert -- Jan. 28, 2003 --, therefor.

In Column 2, Line 31, delete "invention;" and insert -- invention; and --, therefor.

In Column 2, Line 35, delete "invention;" and insert -- invention. --, therefor.

Signed and Sealed this
Third Day of July, 2012

David J. Kappos
*Director of the United States Patent and Trademark Office*